United States Patent
Dziak et al.

(10) Patent No.: US 9,286,915 B1
(45) Date of Patent: Mar. 15, 2016

(54) SYSTEMS AND METHODS FOR FORMAT EFFICIENT SECTOR FRAGMENT PROCESSING

(71) Applicant: Avago Technologies General IP (Singapore) Pte. Ltd., Singapore (SG)

(72) Inventors: Scott M. Dziak, Fort Collins, CO (US); Siva Swaroop Vontela, Longmont, CO (US); Daniel A. Bressan, Commerce City, CO (US)

(73) Assignee: Avago Technologies General IP (Singapore) Pte. Ltd. (SG)

(*) Notice: Subject to any disclaimer, the term of this patent is extended or adjusted under 35 U.S.C. 154(b) by 0 days.

(21) Appl. No.: 14/656,655

(22) Filed: Mar. 12, 2015

(51) Int. Cl.
*G11B 5/02* (2006.01)
*G11B 5/012* (2006.01)

(52) U.S. Cl.
CPC .................... *G11B 5/012* (2013.01)

(58) Field of Classification Search
CPC ............ G11B 20/1403; G11B 20/10009; G11B 5/09; G11B 27/3027; G11B 2220/90; G11B 27/36; G11B 5/012; G11B 5/02
USPC .............. 360/25, 31, 42, 45, 48, 51
See application file for complete search history.

(56) References Cited

U.S. PATENT DOCUMENTS

| | | | |
|---|---|---|---|
| 7,508,611 B2 * | 3/2009 | Buch et al. ............... | 360/51 |
| 7,529,320 B2 | 5/2009 | Byrne et al. | |
| 7,742,556 B1 | 6/2010 | Quan et al. | |
| 8,250,434 B2 | 8/2012 | Yang | |
| 8,508,878 B1 * | 8/2013 | Zou et al. ............... | 360/51 |
| 8,514,507 B2 | 8/2013 | Isono et al. | |
| 8,599,508 B1 | 12/2013 | Burd | |
| 8,837,068 B1 | 9/2014 | Liao et al. | |
| 2012/0063022 A1 | 3/2012 | Mathew | |
| 2012/0063023 A1 | 3/2012 | Mathew | |
| 2012/0063024 A1 | 3/2012 | Mathew | |
| 2012/0063284 A1 | 3/2012 | Mathew | |
| 2012/0105994 A1 | 5/2012 | Bellorado | |
| 2014/0085114 A1 | 3/2014 | Cideciyan et al. | |

OTHER PUBLICATIONS

U.S. Appl. No. 14/611,949, filed Feb. 2, 2015, Han, Yang.
U.S. Appl. No. 13/618,317, filed Sep. 14, 2012, Xiao, Jun.
U.S. Appl. No. 14/529,587, filed Oct. 31, 2014, Lu, Lu.

* cited by examiner

Primary Examiner — Nabil Hindi

(57) ABSTRACT

Embodiments are related to systems and methods for data processing, and more particularly to systems and methods for format efficient processing of data fragments.

20 Claims, 6 Drawing Sheets

SYSTEMS AND METHODS FOR FORMAT EFFICIENT SECTOR FRAGMENT PROCESSING

FIELD OF THE INVENTION

Embodiments are related to systems and methods for data processing, and more particularly to systems and methods for format efficient processing of data fragments.

BACKGROUND

Various storage access systems have been developed that include an ability to sense data previously stored on a storage medium. Such storage access systems generally include circuitry and/or software used to process a sensed signal from a storage medium, and to process the sensed data in an attempt to recover an originally written data set. The data may be distributed across the surface of a storage medium in tracks, with encoded user data distributed across the tracks with intervening alignment information. Such alignment information allows for proper synchronization with the user data, but wastes room on the storage medium that could otherwise be used for storing user information.

Hence, for at least the aforementioned reasons, there exists a need in the art for advanced systems and methods for format efficient storage.

SUMMARY

Embodiments are related to systems and methods for data processing, and more particularly to systems and methods for format efficient processing of data fragments. In some cases, the data fragments are written coherently, but read back incoherently.

Various embodiments provide data processing systems that include a data processing circuit, a zero phase start (ZPS) calculation circuit, a distance counter, and a zero phase start alignment circuit. The data processing circuit is operable to receive a set of data having at least a first fragment and a second fragment. The first fragment includes an initial alignment data and the second fragment includes a subsequent alignment data. The zero phase start calculation circuit is operable to calculate a zero phase start output based upon the initial alignment data. The distance counter is operable to count a distance between elements of the initial alignment data and corresponding elements of the subsequent alignment data. The zero phase start alignment circuit is operable to modify a portion of the zero phase start output to yield a modified zero phase start output based at least in part on the distance. Processing of the subsequent alignment data uses the modified zero phase output.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 1b shows one example of data distribution on the storage medium of FIG. 1a;

DETAILED DESCRIPTION OF SOME EMBODIMENTS

Figure 1A:
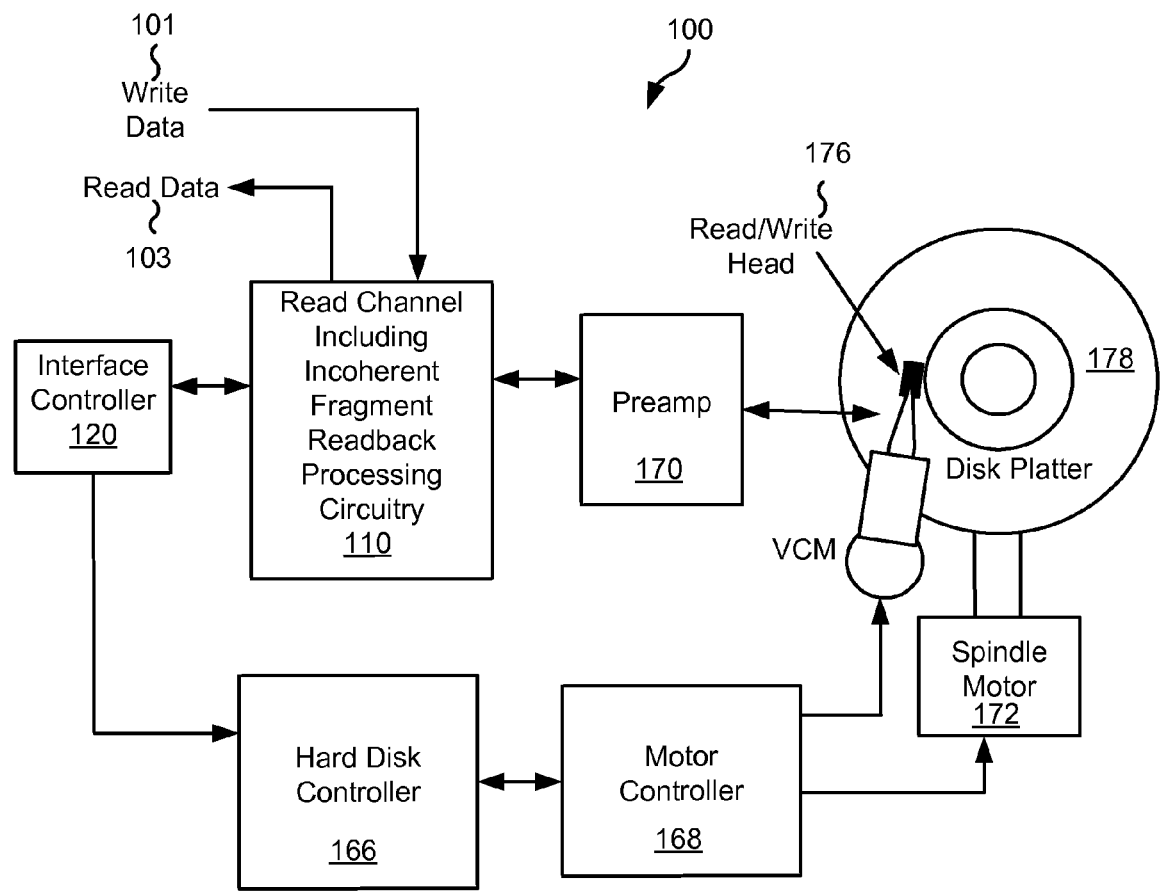
FIG. 1a shows a storage system including incoherent fragment readback processing circuitry in accordance with various embodiments of the present inventions.

Embodiments are related to systems and methods for data processing, and more particularly to systems and methods for format efficient processing of data fragments.

In some cases, sectors of data may be written broken up into multiple fragments, with each fragment containing both signal acquisition alignment information and data. When the multiple fragments are written during the same disk revolution, alignment information from the first fragment can be exploited to minimize the required length of the alignment information from the subsequent fragments, so long as the read back of the individual fragments is in the same revolution. However, when fragments are processed in different chunk sizes from what they naturally take, it is possible that only partial alignment information may be received. Various embodiments of the present invention provide circuits, systems and methods for processing partial alignment information in a second or later fragment by re-using gross phase information generated during the processing of prior alignment information from the sector. For example, where a signal is processed 4T at a time, and the alignment information exhibits a 6T periodicity (e.g., '1 1 1 0 0 0 1 1 1 0 0 0 1 1 1 0 0 0 1 1 1 0 0 0'), the 4T processing bundles may take any of the following: (A) "1110", (B) '0011' or (C) '1000'. These 4T bundles repeat every three sets of 4T clock cycles. Further, there are six possible alignments for a 6T preamble, known as hexants: '1 1 1 0 0 0', '0 1 1 1 0 0', '0 0 1 1 1 0', '0 0 0 1 1 1', '1 0 0 0 1 1' and '1 1 0 0 0 1'. When an initial alignment information is being processed, it is unknown which hexant is being processed, and thus a zero phase start calculation is performed to discern which hexant is being processed. The zero phase start process solves for the hexant. Once the operating hexant is computed, the positions of zero crossings and expected position of the sync mark is known. If, during the writing process, we constrain the writes to be 12T apart (i.e., the least common multiple of 6 and 4), we consider the write to be coherent. During the readback process, if start the second or later fragment read with 4T alignment to the first read, but not 12T alignment, the read is incoherent, meaning we can see any one of:

(A) (B) (C) (A) (B) (C) (A) (B) (C)
(B) (C) (A) (B) (C) (A) (B) (C) (A)
(C) (A) (B) (C) (A) (B) (C) (A) (B)

By solving for the hexant during readback of an initial fragment, and counting the number of clocks since the zero phase start of the initial fragment has commenced, the same hexant can be used for subsequent fragments obviating the need to re-compute the hexant and reducing the amount of preamble required to process subsequent fragments.

Various embodiments provide data processing systems that include a data processing circuit, a zero phase start calculation circuit, a distance counter, and a zero phase start alignment circuit. The data processing circuit is operable to receive a set of data having at least a first fragment and a second fragment. The first fragment includes an initial alignment data (in some cases, this is a long preamble) and the second fragment includes a subsequent alignment data (in some cases, this is a short preamble). The zero phase start calculation circuit is operable to calculate a zero phase start output based upon the initial alignment data. The distance counter is operable to count a distance between elements of the initial alignment data and corresponding elements of the subsequent alignment data. In some cases, the distance counter counts a distance between start points of preamble processing of these adjacent fragments. The zero phase start alignment circuit is operable to modify a portion of the zero phase start value obtained from first fragment alignment data to yield a modified zero phase start output based at least in part on the distance (i.e., the output of the distance counter). Processing of the subsequent alignment data uses the modified zero phase output.

In some instances of the aforementioned embodiments, the initial alignment data includes a full preamble segment, and the subsequent alignment data includes a short preamble segment. In some cases, the full preamble segment and the short preamble segment include repeating patterns. These repeating patterns may be, but are not limited to, a 3T pattern, a 4T pattern, or a 5T pattern.

In various instances of the aforementioned embodiments, the system includes an AB filter. As used herein, the phrase "AB filter" is used in its broadest sense to mean any filter that provides digital interpolation during processing of a periodic signal such as, for example, a preamble pattern. As one example, an AB filter may be a two tap FIR filter having A and B as coefficients/taps. The AB filter is operable to generate a phase offset version of the alignment data. The phase offset of the AB filter during processing of the initial full preamble alignment data is initialized to a target phase (referred to herein as LPE) at the beginning of the fragment and is snapped to a phase adjustment derived from the zero phase start output and rotated back to the original LPE target phase so that AB filter output data is always maintained at zero phase. It should be noted that the target phase may be a loop pulse estimator as is known in the art, but that one of ordinary skill in the art will recognize other sources for target phase that may be used in relation to different embodiments. Additionally, the phase offset of the AB filter during processing of subsequent short preamble alignment data is maintained at the LPE target phase without any phase snap or rotation as the ZPS phase slew is not necessary and is disabled in this case, thus allowing a reduction in needed preamble length to begin processing. In some cases, the system further includes a zero crossing and slope selection circuit. The zero crossing and slope selection circuit is operable to select a first slope and a first zero crossing information every 4T cycle based upon the zero phase start output during processing of the initial full preamble alignment data; and select a second slope and a second zero crossing information every 4T cycle based upon the modified zero phase start output during processing of the subsequent short preamble alignment data. In addition, the system may include an acquire timing error correction circuit operable to: generate a first clock adjustment value based upon a combination of the first slope, the first zero crossing, and a first instance of the phase offset version of the initial alignment data during processing of the initial alignment data; and generate a second clock adjustment value based upon a combination of the second slope, the second zero crossing, and a second instance of the phase offset version of the initial alignment data during processing of the subsequent alignment data. In some cases, the system further includes: an analog to digital converter sample clock adjustment circuit operable to: modify an analog to digital converter sample clock based upon the first clock adjustment value during processing of the initial alignment data; and modify the analog to digital converter sample clock based upon the second clock adjustment value during processing of the subsequent alignment data; and an analog to digital converter circuit operable to generate a series of digital samples from an analog input synchronous to the analog to digital converter sample clock. The set of data is derived from the series of digital samples.

In some instances of the aforementioned embodiments, the data processing circuit is a first data processing circuit, the set of data is a first set of data derived from a first read head, the zero phase start circuit is a first zero phase start circuit, the zero phase start output is a first zero phase start output. In such instances, the systems further include: a second data processing circuit operable to receive a second set of data derived from a second read head having at least the first fragment and the second fragment; a second zero phase start calculation circuit operable to calculate a second zero phase start output based upon the initial alignment data; and a zero phase start output combining circuit operable to combine the first zero phase start output and the second zero phase start output to yield a combined zero phase start output. The zero phase start alignment circuit is operable to modify a portion of the combined zero phase start output to yield the modified zero phase start output based at least in part on the distance counter. Processing of the subsequent alignment data uses the modified zero phase start output.

In one or more instances of the aforementioned embodiments, when using 3T preamble alignment data, the zero phase start alignment circuit is operable to: calculate a modulo three of the distance counter; add the module three value to a hexant of the zero phase start output obtained from the initial full preamble alignment data to yield an interim zero phase start output; and force the interim zero phase start output into an expected range to yield a hexant of the modified zero phase start output. In various cases, the system is implemented as part of an integrated circuit. In one or more cases, the system is implemented as part of a storage device. The storage device includes: a storage medium storing information corresponding to the set of data; and a read/write head assembly disposed in relation to the storage medium.

Other embodiments provide methods for data processing that include: receiving a set of data having at least a first fragment and a second fragment, where the first fragment includes an initial alignment data and the second fragment includes a subsequent alignment data; calculating a zero phase start based upon the initial alignment data using a zero phase start calculation circuit; counting a distance between start points of preamble processing of these adjacent fragments; modifying a portion of the zero phase start output obtained from the initial full preamble alignment data to yield a modified zero phase start output based at least in part on the distance counter; and processing the subsequent alignment data using the modified zero phase start output.

In some instances of the aforementioned embodiments, the initial alignment data includes a full preamble segment, and the subsequent alignment data includes a short preamble segment. The full preamble segment and the short preamble segment include repeating patterns such as, for example, a 3T pattern, a 4T pattern, or a 5T pattern. In some instances of the aforementioned embodiments, the methods include using an AB filter to generate a phase offset version of the alignment data. The phase offset of the AB filter during processing of the initial full preamble alignment data is initialized to the LPE target phase at the beginning of the fragment and is snapped to a phase adjustment derived from the zero phase start output and rotated back to the original LPE target phase so that AB filter output data is always maintained at zero phase. And the phase offset of the AB filter during processing of subsequent short preamble alignment data is always maintained at the LPE target phase without any phase snap or rotation In some cases, the method further includes: selecting a first slope and a first zero crossing based upon the zero phase start output during processing of the initial alignment data; selecting a second slope and a second zero crossing based upon the modified zero phase start output during processing of the subsequent alignment data; generating a first clock adjustment value based upon a combination of the first slope, the first zero crossing, and a first instance of the phase offset version of the initial alignment data during processing of the initial alignment data; and generating a second clock adjustment value based upon a combination of the second slope, the second zero crossing, and a second instance of the phase offset version of the initial alignment data during processing of the subsequent alignment data. In some cases, the methods further include: modifying an analog to digital converter sample clock based upon the first clock adjustment value during processing of the initial alignment data; modifying the analog to digital converter sample clock based upon the second clock adjustment value during processing of the subsequent alignment data; and generating a series of digital samples from an analog input synchronous to the analog to digital converter sample clock, wherein the set of data is derived from the series of digital samples.

In some instances of the aforementioned embodiments, modifying the portion of the zero phase start output to yield the modified zero phase start output includes: calculating a modulo three of the distance counter; adding the computed modulo three value to a hexant of the zero phase start output obtained from the initial full preamble alignment data to yield an interim zero phase start output; and forcing the interim zero phase start output into an expected range to yield a hexant of the modified zero phase start output.

Other embodiments provide data processing systems that include: a first data processing circuit, a second data processing circuit, a first zero phase start calculation circuit, a second zero phase start calculation circuit, a zero phase start output combining circuit, a distance counter, and a zero phase start output modification circuit. The first data processing circuit is operable to receive a first set of data having at least a first fragment and a second fragment, where the first fragment includes an initial alignment data and the second fragment includes a subsequent alignment data, and the first set of data is derived from a first read head. The second data processing circuit is operable to receive a second set of data having at least the first fragment and the second fragment, where the first fragment includes the initial alignment data and the second fragment includes the subsequent alignment data, and the second set of data is derived from a second read head. The first zero phase start calculation circuit is operable to calculate a first zero phase start output based upon the initial alignment data from the first set of data. The second zero phase start calculation circuit is operable to calculate a second zero phase start output based upon the initial alignment data from the second set of data. The zero phase start output combining circuit is operable to combine the first zero phase start output and the second zero phase start output to yield a combined zero phase output. The distance counter is operable to count a distance between start points of preamble processing of these adjacent fragments. The zero phase start alignment circuit is operable to modify a portion of the combined zero phase start output to yield a modified zero phase start output based at least in part on the distance (i.e., the output of the distance counter). Processing of the subsequent alignment data uses the modified zero phase output.

Turning to FIG. 1a, a storage system 100 including a read channel circuit 110 incoherent fragment readback processing circuitry in accordance with various embodiments of the present inventions. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

Data written to disk platter 178 includes a number of data fragments with intervening alignment data. The intervening alignment data includes a preamble pattern used for clock synchronization. One track includes a preamble pattern with a first periodicity, and the adjacent tracks include a preamble pattern with a second periodicity. For example, in one particular implementation one track may include 2T (e.g., 11001100 . . . ) preamble patterns, while the other tracks may include 3T (e.g., 111000111000 . . . ) preamble patterns. Other combinations of alternating preamble patterns may be used in relation to different embodiments of the present invention. Such alternating preamble patterns minimize interference from adjacent tracks while processing preamble data of a particular track. Such alternating preamble patterns may be processed using a system including a circuit similar to that discussed below in relation to FIG. 5, and/or may be done using a process similar to that discussed below in relation to FIGS. 3 and 4.

Figure 1B:
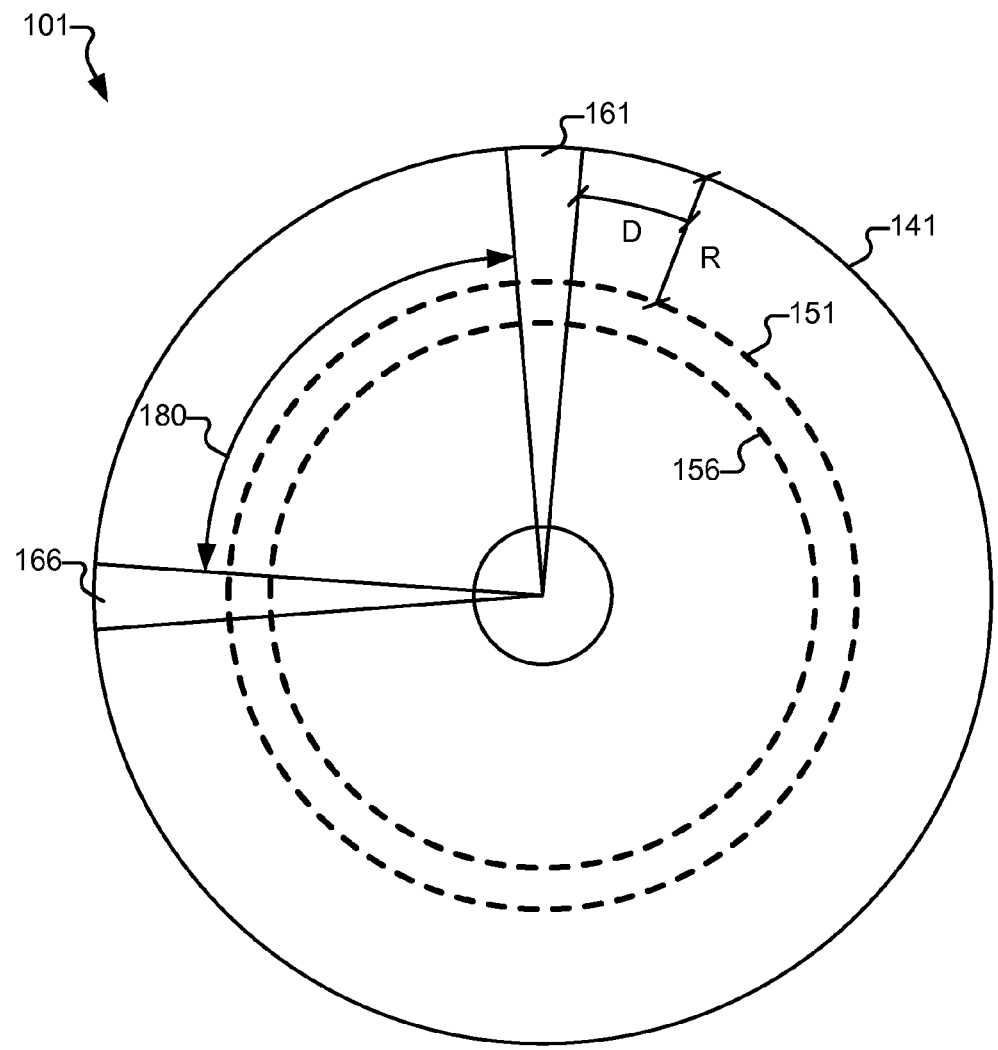

Turning to FIG. 1b, a storage medium 101 is shown with two exemplary tracks 151,156 indicated as dashed lines. The tracks are segregated by servo data written within wedges 161, 166 (i.e., servo wedges). These wedges include data and supporting bit patterns 111 that are used for control and synchronization of the read/write head assembly over a desired location on storage medium 101. In particular, these wedges generally include a preamble pattern 192 followed by a sector address mark 194 (SAM). Sector address mark 194 is followed by a Gray code 196, and Gray code 196 is followed by burst information 198. It should be noted that while two tracks and two wedges are shown, hundreds of each would typically be included on a given storage medium. User data including fragments interspaced by alignment data is disposed between wedges over areas such as, for example, region 180.

Figure 2A:
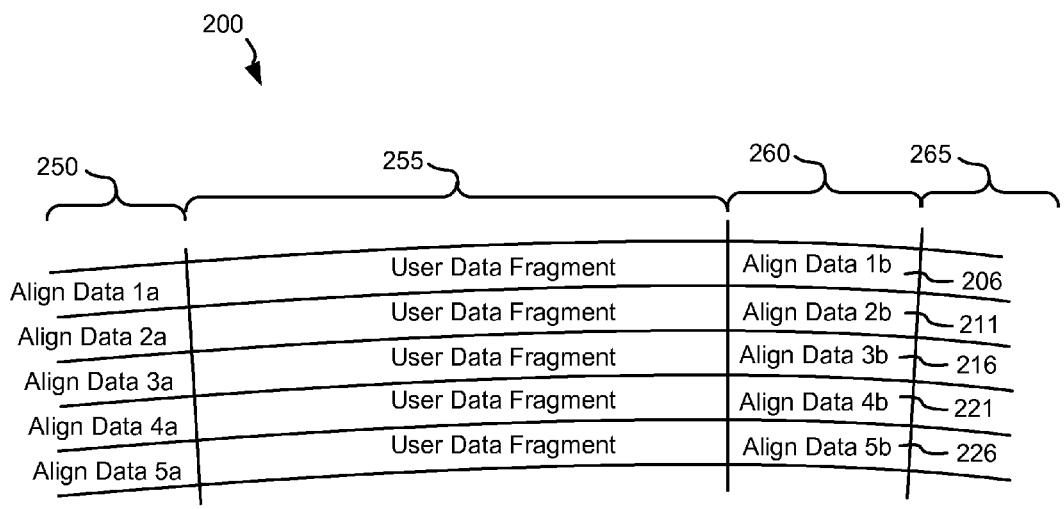
FIGS. 2a-2b show an example of tracks on a storage medium including user data fragments and interspersed alignment data where the interspersed alignment data exhibits alternating periodicity.
Figure 2B:
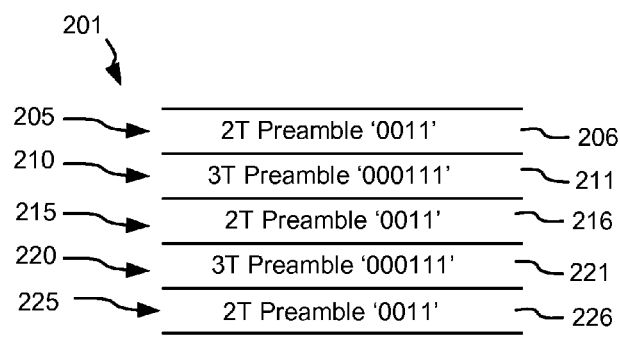

Turning to FIG. 2a, an example 200 of a number of adjacent tracks 206, 211, 216, 221, 226 of a user data region on a storage device is shown. As shown each of tracks include a first set of alignment data 250 preceding a first user data fragment 255. Another set of alignment data 260 separates first user data fragment 255 and a second user data fragment 265. As shown in FIG. 2b, an example 201 shows alternating preamble types for each of tracks 206, 211, 216, 221, 226. Alignment data 250 and alignment data 260 in the example each includes: a 2T preamble 205 for track 206; a 3T preamble 210 for track 211; a 2T preamble 215 for track 216; a 3T preamble 220 for track 221; and a 2T preamble 225 for track 226. Such alternating preamble patterns help to limit inter-track interference during processing of the preamble fields if orthogonal patterns are used. Again, it should be noted that while the examples of FIG. 2 are shown as alternating 2T preambles with 3T preambles, other embodiments may utilize other preamble periodicities including, but not limited to, 4T, 5T, or others.

It should be noted that storage system 100 of FIG. 1a may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 of FIG. 1a may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platter 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 3:
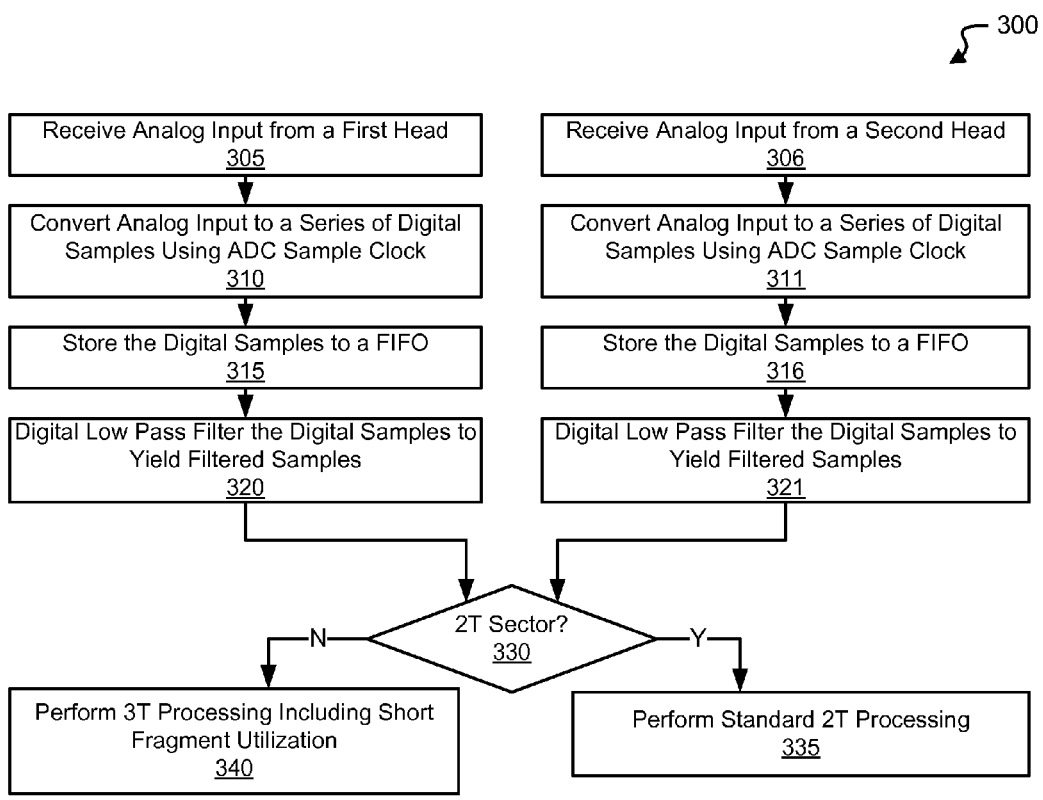
FIG. 3 is a flow diagram showing a method in accordance with some embodiments of the present invention for processing user data including 3T processing with incoherent fragment readback processing in accordance with one or more embodiments of the present invention.

Turning to FIG. 3, a flow diagram 300 show a method in accordance with some embodiments of the present invention for processing user data, including 3T preamble processing with incoherent fragment readback processing in accordance with one or more embodiments of the present invention. Following flow diagram 300, an analog input is received from a first head flying over a target track of a storage medium (block 305). This analog data represents information previously stored to the target track of the storage medium. In the case of the alternating preamble patterns discussed above in relation to FIGS. 2a-2b, some of the information will be alignment data and user fragment data for the given track. The alignment data will include a preamble pattern with the periodicity written to the target track. The analog input is converted into a series of digital samples synchronous to an analog to digital converter sample clock (block 310). This conversion may be done using any approach to analog to digital conversion known in the art. The resulting digital samples are stored to a FIFO buffer (block 315). The FIFO buffer allows for data derived from one head to be moved in time relative to data from another head that is flying over the same target track, but is physically offset and thus results in the same data being sensed at different times by the different heads. Such compensation for the physical offset between the data sets derived from the two different heads may be done using any approach known in the art. The digital samples accessed from the FIFO buffer are filtered using a digital low pass filter to yield filtered samples (block 320). In some cases, the digital low pass filter is a ten tap digital filter. Based upon the disclosure provided herein, one of ordinary skill in the art will recognize a variety of filters that may be used in accordance with different embodiments.

In parallel to data being received and processed from the first head (blocks 305, 310, 315, 320), an analog input is received from a second head flying over the target track of a storage medium (block 306). This analog data represents information previously stored to the target track of the storage medium. In the case of the alternating preamble patterns discussed above in relation to FIGS. 2a-2b, some of the information will be alignment data and user fragment data for the given track. The alignment data will include a preamble pattern with the periodicity written to the target track. The analog input is converted into a series of digital samples synchronous to an analog to digital converter sample clock (block 311). This conversion may be done using any approach to analog to digital conversion known in the art. The resulting digital samples are stored to a FIFO buffer (block 316). Again, the FIFO buffer allows for data derived from one head to be moved in time relative to data from another head that is flying over the same target track, but is physically offset and thus results in the same data being sensed at different times by the different heads. Such compensation for the physical offset between the data sets derived from the two different heads may be done using any approach known in the art. The digital samples accessed from the FIFO buffer are filtered using a digital low pass filter to yield filtered samples (block 321). In some cases, the digital low pass filter is a ten tap digital filter. Based upon the disclosure provided herein, one of ordinary skill in the art will recognize a variety of filters that may be used in accordance with different embodiments.

It is determined whether the preamble being received from the target track as part of the alignment data is a 2T preamble or a 3T preamble (block 330). Where the received preamble is a 2T preamble (block 330), standard 2T processing is performed (block 335). Such standard 2T processing may be done similar to that discussed in US Pat. Pub. No. 2014/0281818 entitled "Method for Format Savings in Coherently Written Fragmented Sectors", and filed Mar. 14, 2013 by Dziak et al. The entirety of the aforementioned reference is incorporated herein by reference for all purposes. In some such cases, where short alignment data is accessed for the second and later alignment data segments ZPS processing may be skipped and the timing acquisition process relying on the 2T preamble may be started as soon as the results of an AB filter are available. Where the 2T preamble is written with 4T coherency, the 2T data read back from the target track will be 4T coherent and not dependent upon the placement of a read back gate.

Alternatively, where the received preamble is a 3T preamble (block 330), 3T processing is performed (block 340). As the read gate controlling access to the alignment data preceding each fragment is 4T coherent, in various cases the alignment data that is read back will differ depending upon placement of the read back gate. The aforementioned 3T processing compensates for the incoherency while making meaningful use of otherwise wasted portions of the received preamble data. Thus, the aforementioned 3T processing allows for processing the 3T preambles without sacrificing the read back preamble cycles due to the uncertainty in the placement of the read back gate. Such a process involves calculating a zero phase start during an initial set of alignment data (i.e., alignment data including a full preamble) and saving the most significant bits (i.e., the hexant information) of the zero phase start data. The zero phase start hexant information obtained from the initial full preamble alignment data is used to select the zero crossing samples and timing slopes at the output of the AB filter for timing acquisition during full preamble processing. And during the subsequent short preamble alignment data, the zero phase start hexant obtained from the initial full preamble fragment is compensated for any incoherency in the read back data so that the AB filter and a downstream sync mark detector are working on aligned data.

Figure 4:
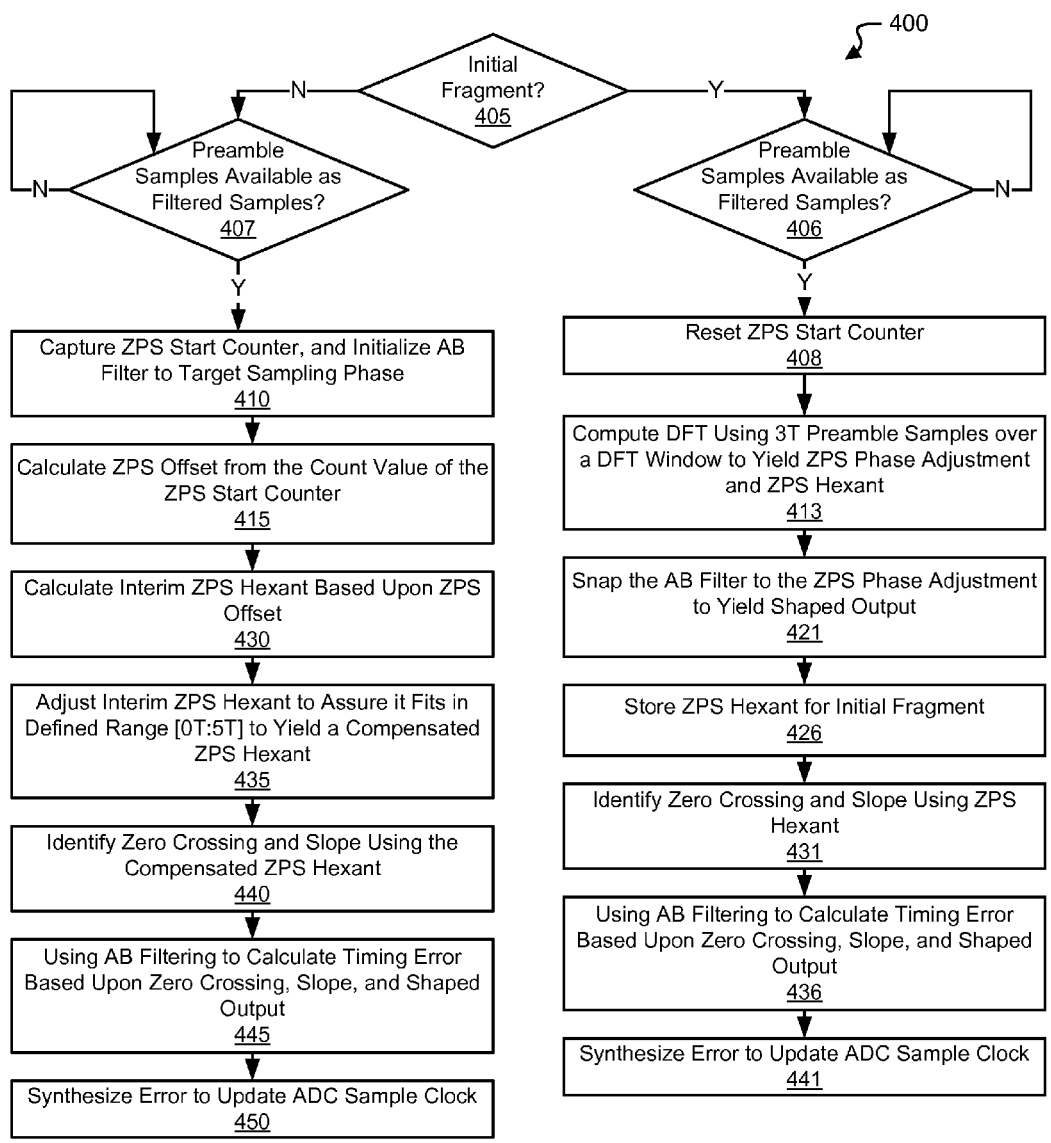
FIG. 4 is a flow diagram showing detail of one implementation of the 3T processing with the incoherent fragment readback processing of FIG. 3 in accordance with various embodiments of the present invention.

Turning to FIG. 4, a flow diagram 400 shows detail of one implementation of the 3T processing with the incoherent fragment readback processing of FIG. 3 in accordance with various embodiments of the present invention. Following flow diagram 400, it is determined whether alignment data being received is associated with an initial full preamble fragment or one or more later short preamble fragments (block 405).

Where it is determined that the alignment data being received is an initial full 3T preamble fragment (block 405), a full processing including zero phase start calculation is performed on the filtered output preamble samples (e.g., the output of a digital low pass filer circuit) from the received alignment data. In such a case, it is determined whether sufficient preamble samples are available as filtered samples to fill a DFT window allowing calculation of a DFT (block 406). In some cases, sufficient preamble samples may be two or more samples. Based upon the disclosure provided herein, one of ordinary skill in the art will recognize another number of preamble samples that may be defined as sufficient. Where sufficient preamble samples are available as filtered samples (block 406), a ZPS start counter is reset and begins incrementing in 4T increments (block 408). At the start of a ZPS DFT (i.e., discrete fourier transform) window, a ZPS start counter is captured as discussed below in relation to block 410, with the count value representing a distance of the start of a DFT window (i.e., a region of the preamble of the alignment data over which ZPS is calculated) covering preamble samples from the alignment data of a subsequent short preamble fragment from the start of a corresponding DFT window in the alignment data from the initial fragment.

Zero phase start (ZPS) processing is applied which calculates a DFT using 3T preamble samples over a DFT window to yield a ZPS adjustment value and a ZPS hexant (block 413). In some embodiments, the ZPS output value is a nine bit phase shift value (ZPS[8:0]). The ZPS hexant is the three most significant bits of the ZPS output (ZPS[8:6]) and represents 1T alignment over one cycle of preamble (e.g., from 0T to 5T), and the least significant six bits of the ZPS output (ZPS[5:0]) are a sub-period phase adjustment (e.g., from −T/2 to T/2) referred to herein as $\phi_{zps}$. Where the preamble samples are 3T samples, the ZPS processing performs a discrete fourier transform (DFT) calculation over 12T/24T/36T/48T of the filtered preamble samples. Once the ZPS output is available, modification of an ADC sampling clock (i.e., the clock used to sample an analog input which yields the preamble samples) starts slewing in steps of $$+/- \frac{4T}{64}$$

to $\phi_{zps}$.

Once the zero phase start value has been computed (block 413), the AB filtering is snapped to the difference between the LPE target phase and the sub-period phase adjustment (i.e., $\phi_{lpe}-\phi_{zps}$). By doing this, the AB filter output provided by the AB filtering achieves a zero phase and the timing loop can acquire zero crossing samples quickly. By snapping to ($\phi_{lpe}-\phi_{zps}$) the AB filtering achieves zero phase without waiting for ZPS phase slew to finish on the ADC samples. As phase corrected ADC samples make their way to the AB filtering process, the AB filtering de-rotates from ($\phi_{lpe}-\phi_{zps}$) back to $\phi_{lpe}$ in steps of $$+/- \frac{4T}{64}$$

in alignment with the slewing of the samples introduced to the AB filtering process. Thus, the AB filter output is the low pass filtered preamble input that is phase shifted. In some particular implementations, the AB filtering may be done using a digital rotator circuit similar to that discussed in U.S. Pat. No. 7,529,320 entitled "Format Efficient Timing Acquisition For Magnetic Recording Read Channels", and filed by Byrne e al on Sep. 16, 2005. The entirety of the aforementioned application is incorporated herein by reference for all purposes.

In addition, the ZPS hexant is stored for use in processing alignment data for subsequent fragments (block 426). Zero crossings and the slope are identified using the ZPS hexant data (block 431). The following table shows the correlation between ZPS hexant data (ZPS[8:6]) and zero crossing and timing slope information where 'S' indicates the shoulder sample:

| ZPS[8:6] | AB filter output<br>AB filter output[(n − 11), (n − 10), (n − 9) . . . (n)] | Zero Crossing<br>Selection | Timing Slope |
| --- | --- | --- | --- |
| 0 | [0 S S 0][−S −S 0 S][S 0 −S −S] | [1001][0010][0100] | [100−1][0010][0−100] |
| 1 | [−S 0 S S][0 −S −S 0][S S 0 −S] | [0100][1001][0010] | [0100][−1001][00−10] |
| 2 | [−S −S 0 S][S 0 −S −S][0 S S 0] | [0010][0100][1001] | [0010][0−100][100−1] |
| 3 | [0 −S −S 0][S S 0 −S][−S 0 S S] | [1001][0010][0100] | [−1001][00−10][0100] |
| 4 | [S 0 −S −S][0 S S 0][−S −S 0 S] | [0100][1001][0010] | [0−100][100−1][0010] |
| 5 | [S S 0 −S][−S 0 S S][0 −S −S 0] | [0010][0100][1001] | [00−10][0100][−1001] |

As used herein, a "shoulder sample" is any sample between a zero sample and a peak sample in a sinusoidal wave form with the location of the shoulder sampled being determined by the target phase. The identified zero crossings, slope, and AB filter output are used by the AB filter to calculate a timing error (block 436), and the timing error is provided to a synthesizer circuit where it is used to update the ADC sampling clock (block 441). Calculation of the timing error and updating the ADC sampling clock may be done using any of the approaches known in the art for performing the calculation and sample clock adjustment.

Alternatively, where it is determined that the alignment data being received is not an initial full preamble fragment (block 405), a partial processing excluding ZPS phase slew is performed on the filtered preamble samples from the received alignment data. In such a case, it is determined whether sufficient preamble samples are available as filtered samples (block 407). In some cases, sufficient preamble samples may be one or more samples. Based upon the disclosure provided herein, one of ordinary skill in the art will recognize another number of preamble samples that may be defined as sufficient. Upon the start of the DFT window (i.e., once sufficient samples are received (block 407)), the ZPS start counter value is captured (block 410). At this juncture, the value on the ZPS start counter represents a distance of the start of a DFT window (i.e., a region of the preamble data) covering preamble samples from the alignment data of a subsequent short preamble fragment from the start of a corresponding DFT window (i.e., a region of the preamble of the alignment data over which ZPS is calculated) in the alignment data from the initial full preamble fragment. This distance is represented as a ZPS start count value which is incremented in 4T increments (i.e., the least significant bit of the ZPS start count value is 4T). A ZPS offset is calculated as the ZPS start count value modulo three (i.e., corresponding to 3T), and represents the amount of incoherency in the placement of a 4T coherent read gate relative to the preamble in the subsequent fragment of the alignment data (block 415). The ZPS Offset is calculated in accordance with the following equation:

ZPS_Offset[1:0]=ZPS Start Count Value modulo 3.

As more fully discussed below, this embodiment compensates for the aforementioned incoherency to align the output of the AB filtering process and a downstream sync mark detection process.

The ZPS hexant (ZPS[8:6]) is compensated through a calculation based upon the ZPS start count value to yield an interim ZPS hexant (I_ZPS[3:0]) (block 430). This interim ZPS hexant is calculated in accordance with the following equation:

I_ZPS[3:0]=ZPS[2:0]+{ZPS Start Count[1:0],1'b0}.

This interim ZPS hexant is then adjusted to assure that the value is between 0T and 5T for the 3T preamble (block 435). This adjustment yields a compensated ZPS hexant (C_ZPS[2:0]). This adjustment is done in accordance with the following pseudocode:

If (I_ZPS[3:0]>5){
   C_ZPS[2:0]=I_ZPS[3:0]−6
}
Else {
   C_ZPS[2:0]=I_ZPS[2:0]
}

Zero crossings and the slope are identified using the compensated ZPS hexant data (block 440). The following table shows the correlation between the compensated ZPS hexant data (C_ZPS[2:0]) and zero crossing and timing slope data where 'S' indicates the shoulder sample:

| C_ZPS[2:0] | AB filter output<br>AB filter output[(n − 11), (n − 10), (n − 9) . . . (n)] | Zero Crossing<br>Selection | Timing Slope |
|---|---|---|---|
| 0 | [0 S S 0][−S −S 0 S][S 0 −S −S] | [1001][0010][0100] | [100−1][0010][0−100] |
| 1 | [−S 0 S S][0 −S −S 0][S S 0 −S] | [0100][1001][0010] | [0100][−1001][00−10] |
| 2 | [−S −S 0 S][S 0 −S −S][0 S S 0] | [0010][0100][1001] | [0010][0−100][100−1] |
| 3 | [0 −S −S 0][S S 0 −S][−S 0 S S] | [1001][0010][0100] | [−1001][00−10][0100] |
| 4 | [S 0 −S −S][0 S S 0][−S −S 0 S] | [0100][1001][0010] | [0−100][100−1][0010] |
| 5 | [S S 0 −S][−S 0 S S][0 −S −S 0] | [0010][0100][1001] | [00−10][0100][−1001] |

The identified zero crossings, slope, and AB filter output are used by the AB filter to calculate a timing error (block 445), and the timing error is provided to a synthesizer circuit where it is used to update the ADC sampling clock (block 450). Calculation of the timing error and updating the ADC sampling clock may be done using any of the approaches known in the art for performing the calculation and sample clock adjustment.

Figure 5:
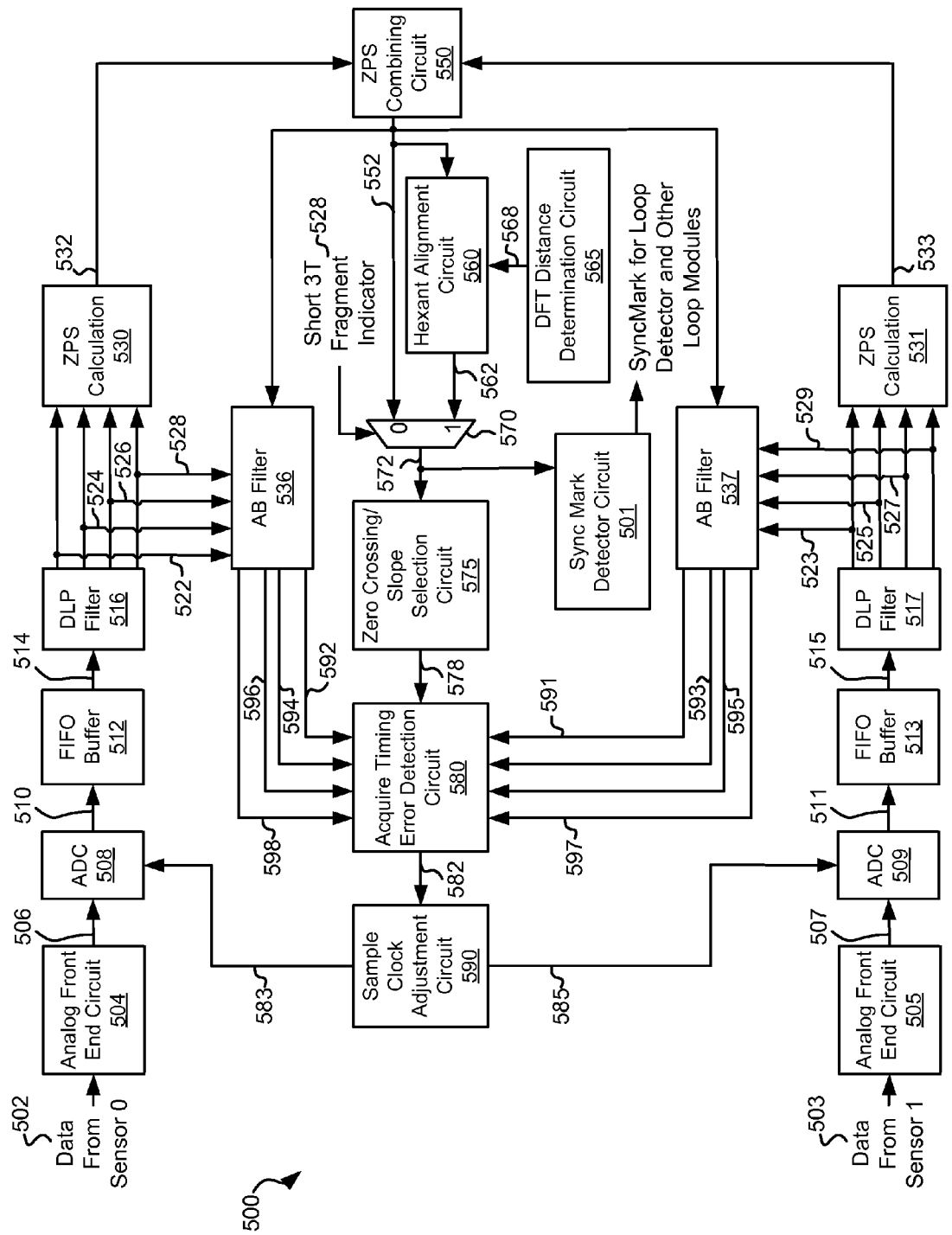
FIG. 5 depicts a synchronization loop circuit having incoherent fragment readback processing circuitry in accordance with some embodiments of the present invention.

Turning to FIG. 5, a synchronization loop circuit 500 having incoherent fragment readback processing circuitry is depicted in accordance with some embodiments of the present invention. Synchronization loop circuit 500 includes an analog front end circuit 504 that receives data 502 from one sensor of a two sensor read/write head (not shown). Data 502 is received as an analog signal derived from sensing information from a track on the storage medium (not shown) and processing through a preamplifier circuit (not shown). Analog front end circuit 504 processes data 502 to yield a processed analog signal 506. Analog front end circuit 504 may include, but is not limited to, an analog filter, a variable gain amplifier circuit, magneto resistive asymmetry (MRA) modification circuitry, and/or a DC offset adjustment circuit. Based upon the disclosure provided herein, one of ordinary skill in the art will recognize a variety of circuitry that may be included as part of analog front end circuit 504.

Processed analog signal 506 is provided to an analog to digital converter circuit 508 that converts processed analog signal 506 into a series of corresponding digital samples 510 synchronous to an ADC sampling clock 583. Digital samples 510 are provided to a FIFO buffer circuit 512. An offset into FIFO buffer circuit 512 accounts for the physical offset between sensors on the two sensor read/write head allowing for data samples from one time period to be aligned with samples from another time period such that aligned samples from each sensor represent the same location on a storage medium. Aligned samples 514 are pulled from FIFO buffer circuit 512 and provided to a digital low pass filter 516. Digital low pass filter 516 applies digital low pass filtering to aligned samples 514 to yield filtered samples 522, 524, 526, 528. Filtered samples 522, 524, 526, 528 are four consecutive samples (e.g., sample 522 is sample[n], sample 524 is sample [n-1], sample 526 is sample [n-2] and sample 528 is sample [n-3]). Four consecutive samples 522, 524, 526, 528 are provided to both a ZPS calculation circuit 530 and a AB filter 536.

ZPS calculation circuit 530 processes repeated instances of four consecutive samples 522, 524, 526, 528 to yield a ZPS output (ZPS1[8:0]) 532. ZPS output 532 includes a ZPS hexant which is the three most significant bits of the ZPS output (ZPS1[8:6]) and represents a 1T alignment over one cycle of preamble (e.g., from 0T to 5T). Additionally, ZPS output includes a sub-period phase adjustment which is the six least significant bits of the ZPS output (ZPS1[5:0]) and are referred to herein as $\phi_{zps_1}$. Where the preamble samples received as part of data 502 are 3T samples, the ZPS processing performs a discrete fourier transform (DFT) calculation over 12T/24T/36T/48T of the filtered preamble samples. Once ZPS output 532 is available, modification of ADC sampling clock 583 starts slewing in steps of $$+/- \frac{4T}{64}$$

to $\phi_{zps_1}$. ZPS output 532 is provided to a ZPS combining circuit 550.

AB filter 536 receives a unified ZPS hexant output 552 and a unified ZPS sub-period phase adjustment ($\phi_{zps_2}$). AB filter 536 modifies the phase of repeated instances of four consecutive samples 522, 524, 526, 528 to yield a phase shifted preamble that includes a four consecutive instances 592, 594, 596, 598 corresponding to the received four instances. The phase shifted preamble is provided to an acquire timing error detection circuit 580. In one embodiment, AB filter 536 is a two-tap, unity gain filter that serves as a digital interpolator and phase-shifts a sinusoid input such as the received preamble. In some particular implementations, AB filter 536 may be implemented as a digital rotator circuit similar to that discussed in U.S. Pat. No. 7,529,320 entitled "Format Efficient Timing Acquisition For Magnetic Recording Read Channels", and filed by Byrne et al. on Sep. 16, 2005. The entirety of the aforementioned application was previously incorporated herein by reference for all purposes.

Synchronization loop circuit 500 also includes an analog front end circuit 505 that receives data 503 from the other sensor of the two sensor read/write head (not shown). Data 503 is received as an analog signal derived from sensing information from a track on the storage medium (not shown) and processing through a preamplifier circuit (not shown). Analog front end circuit 505 processes data 503 to yield a processed analog signal 507. Analog front end circuit 505 may include, but is not limited to, an analog filter, a variable gain amplifier circuit, magneto resistive asymmetry (MRA) modification circuitry, and/or a DC offset adjustment circuit. Based upon the disclosure provided herein, one of ordinary skill in the art will recognize a variety of circuitry that may be included as part of analog front end circuit 505.

Processed analog signal 507 is provided to an analog to digital converter circuit 509 that converts processed analog signal 507 into a series of corresponding digital samples 511 synchronous to an ADC sampling clock 585. Digital samples 511 are provided to a FIFO buffer circuit 513. An offset into FIFO buffer circuit 513 accounts for the physical offset between sensors on the two sensor read/write head allowing for data samples from one time period to be aligned with samples from another time period such that aligned samples from each sensor represent the same location on a storage medium. Aligned samples 515 are pulled from FIFO buffer circuit 513 and provided to a digital low pass filter 517. Digital low pass filter 517 applies digital low pass filtering to aligned samples 515 to yield filtered samples 523, 525, 527, 529. Filtered samples 523, 525, 527, 529 are four consecutive samples (e.g., sample 523 is sample[n], sample 525 is sample [n-1], sample 527 is sample [n-2] and sample 529 is sample [n-3]). Four consecutive samples 523, 525, 527, 529 are provided to both a ZPS calculation circuit 531 and a AB filter 536.

ZPS calculation circuit 537 processes repeated instances of four consecutive samples 523, 525, 527, 529 to yield a ZPS output (ZPS2[8:0]) 533. ZPS output 533 includes a ZPS hexant which is the three most significant bits of the ZPS output (ZPS2[8:6]) and represents a 1T alignment over one cycle of preamble (e.g., from 0T to 5T). Additionally, ZPS output includes a sub-period phase adjustment which is the six least significant bits of the ZPS output (ZPS2[5:0]) and are referred to herein as $\phi_{zps_2}$. Where the preamble samples received as part of data 503 are 3T samples, the ZPS processing performs a discrete fourier transform (DFT) calculation over 12T/24T/36T/48T of the filtered preamble samples. Once ZPS output 533 is available, modification of ADC sampling clock 585 starts slewing in steps of $$+/- \frac{4T}{64}$$

to $\phi_{zps_2}$. ZPS output 533 is provided to a ZPS combining circuit 550.

AB filter 537 receives unified ZPS hexant output 552 and a unified ZPS sub-period phase adjustment ($\phi_{zps_2}$). AB filter 537 modifies the phase of repeated instances of four consecutive samples 523, 525, 527, 529 to yield a phase shifted preamble that includes a four consecutive instances 591, 593, 595, 597 corresponding to the received four instances. The phase shifted preamble is provided to an acquire timing error detection circuit 580. In one embodiment, AB filter 537 is a two-tap, unity gain filter that serves as a digital interpolator and phase-shifts a sinusoid input such as the received preamble. In some particular implementations, AB filter 537 may be implemented as a digital rotator circuit similar to that discussed in U.S. Pat. No. 7,529,320 entitled "Format Efficient Timing Acquisition For Magnetic Recording Read Channels", and filed by Byrne et al. on Sep. 16, 2005. The entirety of the aforementioned application was previously incorporated herein by reference for all purposes.

ZPS combining circuit 550 combines ZPS output 532 with ZPS output 533 to yield unified ZPS hexant output 552. The combining of ZPS output 532 with ZPS output 533 may be done using any combination approach known in the art. In one particular embodiment, the combination is done by averaging ZPS output 532 with ZPS output 533 to yield combined ZPS hexant output 552. In other particular embodiments, the combination is done by using a weighted average of ZPS output 532 and ZPS output 533 where the weighting is based upon which of data 502 or data 503 exhibits the highest signal to noise ratio. Based upon the disclosure provided herein, one of ordinary skill in the art will recognize a variety of circuits and/or methods for combining ZPS output 532 and ZPS output 533 to yield combined ZPS hexant output 552.

Combined ZPS hexant output 552 is provided to a selector circuit 570 and a hexant alignment circuit 560. Hexant alignment circuit 560 receives hexant data of combined ZPS hexant output 552 (Combined ZPS[8:6]) for an initial full preamble fragment of alignment data received as part of data 502 and data 503 and adjusts the hexant data based upon a distance value 568 from a DFT distance generation circuit 565. Distance value 568 indicates a distance from the start of a DFT window (i.e., a region of the preamble data) covering preamble samples from the alignment data of a subsequent short preamble fragment from the start of a corresponding DFT window (i.e., a region of the preamble of the alignment data from an initial fragment over which combined ZPS hexant output 552 is calculated) in the alignment data from the initial full preamble fragment. As such, DFT distance generation circuit 565 may be implemented as a counter circuit that counts 4T cycles occurring between preamble data in an initial fragment and the preamble data in subsequent fragments. This count of 4T cycles is provided as distance value 568 to hexant alignment circuit 560.

Hexant alignment circuit 560 calculates an interim ZPS hexant (I_ZPS[3:0]) in accordance with the following equation:

I_ZPS[3:0]=ZPS[2:0]+{ZPS Start Count[1:0],1'b0}, where ZPS [2:0] is the three most significant bits of combined ZPS hexant output 552, and ZPS start count [1:0] is distance value 568. Hexant alignment circuit 560 then adjusts the interim hexant to assure that the value is between 0T and 5T for the 3T preamble. This adjustment yields a compensated ZPS hexant (C_ZPS[2:0]). This adjustment is done in accordance with the following pseudocode:

If (I_ZPS[3:0]>5){
  C_ZPS[2:0]=I_ZPS[3:0]−6
}
Else {
  C_ZPS[2:0]=I_ZPS[2:0]
}

This compensated ZPS hexant is provided to selector circuit 570. Where an initial full fragment is being processed, a short 3T fragment indicator 528 is asserted such that selector circuit 570 provides combined ZPS hexant output 552 as a selected ZPS hexant output 572. Alternatively, where a short fragment of the preamble data is expected in a subsequent fragment, short 3T fragment indicator 528 is asserted such that selector circuit 570 provides aligned ZPS output as selected ZPS hexant output 572. In this way, processing of alignment data for segments occurring after an initial full preamble fragment may be done using ZPS data calculated for the initial full preamble fragment. This allows for use of partial/short 3T preamble in later fragments, thus increasing format efficiency.

Selected ZPS hexant output 572 is provided to both a sync mark detector circuit 501 used to detect a sync mark in the data received as part of data 502 and data 503, and a zero crossing/slope selection circuit 575 that generates zero crossing and slope data used in adjusting ADC sample clocks 583, 585. Zero crossing/slope selection circuit 575 generates zero crossing and slope data in accordance with the following table:

| HEXANT | AB filter output AB filter output[(n − 11), (n − 10), (n − 9) . . . (n)] | Zero Crossing Selection | Timing Slope |
|---|---|---|---|
| 0 | [0 S S 0][−S −S 0 S][S 0 −S −S] | [1001][0010][0100] | [100−1][0010][0−100] |
| 1 | [−S 0 S S][0 −S −S 0][S S 0 −S] | [0100][1001][0010] | [0100][−1001][00−10] |

-continued

| HEXANT | AB filter output<br>AB filter output[(n − 11), (n − 10), (n − 9) ... (n)] | Zero Crossing<br>Selection | Timing Slope |
|---|---|---|---|
| 2 | [−S −S 0 S][S 0 −S −S][0 S S 0] | [0010][0100][1001] | [0010][0−100][100−1] |
| 3 | [0 −S −S 0][S S 0 −S][−S 0 S S] | [1001][0010][0100] | [−1001][00−10][0100] |
| 4 | [S 0 −S −S][0 S S 0][−S −S 0 S] | [0100][1001][0010] | [0−100][100−1][0010] |
| 5 | [S S 0 −S][−S 0 S S][0 −S −S 0] | [0010][0100][1001] | [00−10][0100][−1001] | where the HEXANT in the table is the three most significant bits of selected ZPS hexant output 572 (e.g., ZPS[8:6]), and 'S' represents the shoulder sample. The zero crossing and slope data are provided as an output 578 to acquire timing error detection circuit 580. Acquire timing error detection circuit 580 may be any circuit known in the art that is capable of calculating an ADC clock adjustments 582 based upon output 578; four consecutive instances 592, 594, 596, 598; and four consecutive instances 591, 593, 595, 597. ADC clock adjustments 582 are provided to sample clock adjustment circuit 590. Sample clock adjustment circuit 590 adjusts ADC sample clock 583 based upon the one of ADC clock adjustments 582 calculated based upon a combination of output 578 and four consecutive instances 592, 594, 596, 598; and sample clock adjustment circuit 590 adjusts ADC sample clock 585 based upon the one of ADC clock adjustments 582 calculated based upon a combination of output 578 and four consecutive instances 591, 593, 595, 597. Sample clock adjustment circuit 590 may be any circuit known in the art for modifying the phase of a clock based upon an adjustment input. In one particular embodiment of the present invention, sample clock adjustment circuit 590 is a digital phase lock loop circuit.

Sync mark detector circuit 501 operating on full 3T preamble fragments uses a modulo 3 counter (repeating a count from 0-2) that is reset a fixed offset from the beginning of the preamble window and runs until a sync mark is found. It is important to note all sync mark lengths are a multiple of 12T, thus the last bit of preamble is on the same lane as the last bit of the sync mark. Once the sync mark is detected (with 4T certainty) using Euclidian distance metrics, the output of the modulo 3 counter can be used along with the hexant discussed above (i.e., the three most significant bits of selected ZPS hexant output 572) to determine the proper 1T sync mark alignment. The following table shows the sync mark alignment where for a given hexant, the sync mark lane will bounce between two possible values:

| Hexant | Modulo 3<br>Count = 0 at sync detect | Modulo 3<br>Count = 1 at sync detect |
|---|---|---|
| 0 | Lane_2d | Lane_0d |
| 1 | Lane_3d | Lane_1d |
| 2 | Lane_2d | Lane_0d |
| 3 | Lane_3d | Lane_1d |
| 4 | Lane_2d | Lane_0d |
| 5 | Lane_3d | Lane_1d |

Of note, a value of the modulo 3 counter equal to 2 is null for purposes of alignment, representing a stall stage where more data is awaited from the output of the digital low pass filters.

Sync mark detector circuit 501 operating on short 3T preamble fragments uses a modulo 3 counter (repeating a count from 0-2) that is not reset at the beginning of the preamble window of the short preamble fragment. Rather, the modulo 3 counter free runs through the full preamble fragment after a sync detect to the next short preamble fragment. Once the sync mark is detected (with 4T certainty) using Euclidian distance metrics in the short preamble fragment, the current output of the modulo 3 counter can be used along with the hexant discussed above (i.e., the three most significant bits of selected ZPS hexant output 572 which in this case is the hexant from an initial fragment including a full 3T preamble) to determine the proper 1T sync mark alignment. By using the hexant information from the full preamble fragment, relying on the fragments being written coherently and the modulo 3 counter started with fixed offset to the full preamble fragment; any phase uncertainty in the short preamble fragment is removed. The following table shows the sync mark alignment where for a given hexant, the sync mark lane will bounce between two possible values:

| Hexant | Modulo 3<br>Count = 0 at sync detect | Modulo 3<br>Count = 1 at sync detect |
|---|---|---|
| 0 | Lane_2d | Lane_0d |
| 1 | Lane_3d | Lane_1d |
| 2 | Lane_2d | Lane_0d |
| 3 | Lane_3d | Lane_1d |
| 4 | Lane_2d | Lane_0d |
| 5 | Lane_3d | Lane_1d |

Again, a value of the modulo 3 counter equal to 2 is null for purposes of alignment, representing a stall stage where more data is awaited from the output of the digital low pass filters.

In operation, synchronization loop circuit 500 calculates a combined ZPS hexant output 552 for an initial fragment that includes a full 3T preamble set. This combined ZPS hexant output 552 is stored for use in later alignment data processing that may include a partial 3T preamble at the beginning of a 3T preamble set. When alignment data for subsequent fragments are processed, aligned ZPS output 562 derived from combined ZPS hexant output 552 from the initial fragment is used for processing. During processing of alignment data from the initial fragment, AB filters 536, 537 are snapped to the difference between the loop pulse estimator and the sub period phase adjustment (i.e., $\phi_{lpe}-\phi_{zps}$). By doing this, the AB filter output provided by the shape filtering achieves a zero phase and the timing loop can acquire zero crossing samples quickly. By snapping to a target based upon $\phi_{zps}$, phase corrected digital samples 510, 511 make there way to the shape filtering without waiting for the slewing of $\phi_{zps}$ to finish. As phase corrected digital samples 510, 511 make there way to the shape filtering process, AB filters 536, 537 de-rotate from $(\phi_{lpe}-\phi_{zps})$ back to $\phi_{lpe}$ in steps of $$+/- \frac{4T}{64}$$

in alignment with the slewing of the samples introduced to the shape filtering process. During processing of alignment data from the subsequent fragments, the AB filter circuits 536, 537 are initially set to a loop pulse estimator ($\phi_{lpe}$) for their respective loop. In the subsequent fragments, ZPS slewing is skipped, and thus setting the shape filtering remains static at $\phi_{lpe}$.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent, albeit such a system would not be a circuit. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the system comprising:
   a data processing circuit operable to receive a set of data having at least a first fragment and a second fragment, wherein the first fragment includes an initial alignment data and the second fragment includes a subsequent alignment data;
   a zero phase start calculation circuit operable to calculate a zero phase start output based upon the initial alignment data;
   a distance counter operable to count a distance between elements of the initial alignment data and corresponding elements of the subsequent alignment data; and
   a zero phase start alignment circuit operable to modify a portion of the zero phase start output to yield a modified zero phase start output based at least in part on the distance, wherein processing of the subsequent alignment data uses the modified zero phase output.

2. The data processing system of claim 1, wherein the initial alignment data includes a full preamble segment, and the subsequent alignment data includes a short preamble segment.

3. The data processing system of claim 2, wherein the full preamble segment and the short preamble segment include repeating patterns selected from a group consisting of: a 3T pattern, a 4T pattern, and a 5T pattern.

4. The data processing system of claim 1, wherein the system further comprises:
   a AB filter operable to generate a phase offset version of the initial alignment data, wherein the phase offset is snapped to a first phase adjustment derived from the zero phase start output during processing of the initial alignment data, and wherein the phase offset is initialized to a second phase adjustment derived from the modified zero phase start output during processing of the subsequent alignment data.

5. The data processing system of claim 4, wherein the system further comprises:
   a zero crossing and slope selection circuit operable to: select a first slope and a first zero crossing based upon the zero phase start output during processing of the initial alignment data; and select a second slope and a second zero crossing based upon the modified zero phase start output during processing of the subsequent alignment data; and
   an acquire timing error correction circuit operable to:
      generate a first clock adjustment value based upon a combination of the first slope, the first zero crossing, and a first instance of the phase offset version of the initial alignment data during processing of the initial alignment data; and
      generate a second clock adjustment value based upon a combination of the second slope, the second zero crossing, and a second instance of the phase offset version of the initial alignment data during processing of the subsequent alignment data.

6. The data processing system of claim 5, wherein the system further comprises:
   an analog to digital converter sample clock adjustment circuit operable to:
      modify an analog to digital converter sample clock based upon the first clock adjustment value during processing of the initial alignment data; and
      modify the analog to digital converter sample clock based upon the second clock adjustment value during processing of the subsequent alignment data; and
   an analog to digital converter circuit operable to generate a series of digital samples from an analog input synchronous to the analog to digital converter sample clock, wherein the set of data is derived from the series of digital samples.

7. The data processing system of claim 1, wherein the data processing circuit is a first data processing circuit, wherein the set of data is a first set of data derived from a first read head, wherein the zero phase start circuit is a first zero phase start circuit, wherein the zero phase start output is a first zero phase output; and wherein the system further comprises:
   a second data processing circuit operable to receive a second set of data having at least the first fragment and the second fragment, wherein the second set of data is derived from a second read head;
   a second zero phase start calculation circuit operable to calculate a second zero phase start output based upon the initial alignment data;
   a zero phase start output combining circuit operable to combine the first zero phase start output and the second zero phase start output to yield a combined zero phase output; and
   wherein the zero phase start alignment circuit is operable to modify a portion of the combined zero phase start output to yield the modified zero phase start output based at least in part on the distance, wherein processing of the subsequent alignment data uses the modified zero phase output.

8. The data processing system of claim 1, wherein the zero phase start alignment circuit is operable to:
   calculate a modulo three of the distance;
   add the module three to a hexant of the zero phase start output to yield to yield an interim zero phase output; and
   force the interim zero phase start output into an expected range to yield a hexant of the modified zero phase output.

9. The data processing system of claim 1, wherein the system is implemented as part of an integrated circuit.

10. The data processing system of claim 1, wherein the system is implemented as part of a storage device, and wherein the storage device comprises:
- a storage medium storing information corresponding to the set of data; and
- a read/write head assembly disposed in relation to the storage medium.

11. A method for data processing, the method comprising:
- receiving a set of data having at least a first fragment and a second fragment, wherein the first fragment includes an initial alignment data and the second fragment includes a subsequent alignment data;
- calculating a zero phase start based upon the initial alignment data using a zero phase start calculation circuit;
- counting a distance between elements of the initial alignment data and corresponding elements of the subsequent alignment data;
- modifying a portion of the zero phase start output to yield a modified zero phase start output based at least in part on the distance; and
- processing the subsequent alignment data using the modified zero phase output.

12. The method of claim 11, wherein the initial alignment data includes a full preamble segment, and the subsequent alignment data includes a short preamble segment; and wherein the full preamble segment and the short preamble segment include repeating patterns selected from a group consisting of: a 3T pattern, a 4T pattern, and a 5T pattern.

13. The method of claim 11, the method further comprising:
- generating a phase offset version of the initial alignment data, wherein the phase offset is snapped to a first phase adjustment derived from the zero phase start output during processing of the initial alignment data, and wherein the phase offset is initialized to a second phase adjustment derived from the modified zero phase start output during processing of the subsequent alignment data.

14. The method of claim 13, the method further comprising:
- selecting a first slope and a first zero crossing based upon the zero phase start output during processing of the initial alignment data;
- selecting a second slope and a second zero crossing based upon the modified zero phase start output during processing of the subsequent alignment data;
- generating a first clock adjustment value based upon a combination of the first slope, the first zero crossing, and a first instance of the phase offset version of the initial alignment data during processing of the initial alignment data; and
- generating a second clock adjustment value based upon a combination of the second slope, the second zero crossing, and a second instance of the phase offset version of the initial alignment data during processing of the subsequent alignment data.

15. The method of claim 14, the method further comprising:
- modifying an analog to digital converter sample clock based upon the first clock adjustment value during processing of the initial alignment data;
- modifying the analog to digital converter sample clock based upon the second clock adjustment value during processing of the subsequent alignment data; and
- generating a series of digital samples from an analog input synchronous to the analog to digital converter sample clock, wherein the set of data is derived from the series of digital samples.

16. The method of claim 11, wherein modifying the portion of the zero phase start output to yield the modified zero phase start output comprises:
- calculating a modulo three of the distance;
- adding the module three to a hexant of the zero phase start output to yield to yield an interim zero phase output; and
- forcing the interim zero phase start output into an expected range to yield a hexant of the modified zero phase output.

17. A data processing system, the system comprising:
- a first data processing circuit operable to receive a first set of data having at least a first fragment and a second fragment, wherein the first fragment includes an initial alignment data and the second fragment includes a subsequent alignment data, and wherein the first set of data is derived from a first read head;
- a first zero phase start calculation circuit operable to calculate a first zero phase start output based upon the initial alignment data from the first set of data;
- a second data processing circuit operable to receive a second set of data having at least the first fragment and the second fragment, wherein the first fragment includes the initial alignment data and the second fragment includes the subsequent alignment data, and wherein the second set of data is derived from a second read head;
- a second zero phase start calculation circuit operable to calculate a second zero phase start output based upon the initial alignment data from the second set of data;
- a zero phase start output combining circuit operable to combine the first zero phase start output and the second zero phase start output to yield a combined zero phase output
- a distance counter operable to count a distance between elements of the initial alignment data and corresponding elements of the subsequent alignment data; and
- a zero phase start alignment circuit operable to modify a portion of the combined zero phase start output to yield a modified zero phase start output based at least in part on the distance, wherein processing of the subsequent alignment data uses the modified zero phase output.

18. The system of claim 17, wherein the zero phase start alignment circuit is operable to:
- calculate a modulo three of the distance;
- add the module three to a hexant of the zero phase start output to yield to yield an interim zero phase output; and
- force the interim zero phase start output into an expected range to yield a hexant of the modified zero phase output.

19. The system of claim 17, wherein the system further comprises:
- a AB filter operable to generate a phase offset version of the initial alignment data, wherein the phase offset is snapped to a first phase adjustment derived from the first zero phase start output during processing of the initial alignment data, and wherein the phase offset is initialized to a second phase adjustment derived from the modified zero phase start output during processing of the subsequent alignment data.

20. The system of claim 19, wherein the system further comprises:
- a zero crossing and slope selection circuit operable to:
  select a first slope and a first zero crossing based upon the combined zero phase start output during processing of the initial alignment data; and select a second slope and a second zero crossing based upon the modified zero phase start output during processing of the subsequent alignment data;

an acquire timing error correction circuit operable to:
  generate a first clock adjustment value based upon a combination of the first slope, the first zero crossing, and a first instance of the phase offset version of the initial alignment data during processing of the initial alignment data; and
  generate a second clock adjustment value based upon a combination of the second slope, the second zero crossing, and a second instance of the phase offset version of the initial alignment data during processing of the subsequent alignment data;

an analog to digital converter sample clock adjustment circuit operable to:
  modify an analog to digital converter sample clock based upon the first clock adjustment value during processing of the initial alignment data; and
  modify the analog to digital converter sample clock based upon the second clock adjustment value during processing of the subsequent alignment data; and an analog to digital converter circuit operable to generate a series of digital samples from an analog input synchronous to the analog to digital converter sample clock, wherein the set of data is derived from the series of digital samples.

\* \* \* \* \*